United States Patent [19]

Fowler et al.

[11] Patent Number: 5,466,048
[45] Date of Patent: Nov. 14, 1995

[54] BACKREST RELEASE MECHANISM

[75] Inventors: Thomas J. Fowler, Canton; Liviu Rus, Troy, both of Mich.

[73] Assignee: Lear Seating Corporation, Southfield, Mich.

[21] Appl. No.: 260,999

[22] Filed: Jun. 16, 1994

[51] Int. Cl.⁶ .............................. B60N 2/02; B60N 2/20
[52] U.S. Cl. ................... 297/378.12; 297/336; 297/337; 296/65.1; 296/69
[58] Field of Search .............................. 297/378.12, 331, 297/335, 336, 337; 296/65.1, 69

[56] References Cited

U.S. PATENT DOCUMENTS

| | | | |
|---|---|---|---|
| 3,679,259 | 7/1972 | Simonelli | 297/379 |
| 4,606,577 | 8/1986 | Hirama et al. | 297/331 |
| 4,793,649 | 12/1988 | Yamano et al. | 296/65.1 |
| 4,869,541 | 9/1989 | Wainwright | 296/65.1 X |
| 5,022,698 | 6/1991 | Butt et al. | 296/65.1 X |
| 5,133,589 | 7/1992 | Kimura | 297/335 |

FOREIGN PATENT DOCUMENTS

| | | | |
|---|---|---|---|
| 3611929 | 10/1987 | Germany | 297/378.12 |
| 61-271142A | 12/1986 | Japan | B60N 1/10 |

*Primary Examiner*—Peter R. Brown
*Assistant Examiner*—Anthony Barfield
*Attorney, Agent, or Firm*—Howard & Howard

[57] ABSTRACT

A vehicular seating assembly (14) includes a seat cushion (20) and a seat back (22). The seat back (22) is locked in the seat forming position when the pawl (46) is locked into the seat back notch (54) by the bell crank (34). When the seat cushion (20) is moved out of the seat forming position, the spring (52) forces the bell crank (34) to rotate (counter clockwise in the Figures) unlocking the pawl (46) from the seat back notch (54). The torsion bar (32) receives the seat cushion (20) when the seat cushion (20) is returned to the seat forming position rotating the bell crank (34) back into locking engagement with the pawl (46) via a linkage (36).

18 Claims, 3 Drawing Sheets

5,466,048

BACKREST RELEASE MECHANISM

BACKGROUND ART

1. Technical Field

The subject invention relates to vehicular seat assemblies. More particularly, the subject invention relates to locking mechanisms for pivotal seats of vehicular seat assemblies.

2. Background of the Invention

The sophistication of seating assemblies for station wagons and sport utility vehicles is increasing as the popularity of these types of vehicles increases. As the popularity increases, seat linkage systems are required to move the seat back and the seat cushion with fewer interactive steps between the seat linkage system and the operator. This is especially true for the large bench seats found in the sport utility vehicles where it becomes difficult to maneuver the seat back and/or seat cushion into the desired position. Ideally, a seat back latching mechanism invisible to the user is preferred.

U.S. Pat. No. 3,679,259, issued to Simonelli on Jul. 25, 1972, discloses a seat latch wherein the supporting arm of the seat back extends past the pivot point of the frame of the seat assembly and includes an abutment surface which abuts a wall of the frame when the seat back is in the upright seat forming position. A cam locking member engages a cam surface opposite the abutment to prevent the seat back from pivoting to its folded position. Although the latching system disclosed in the Simonelli reference is simple and effective, the latching mechanism is not invisible to the operator of the seat. More specifically, the latching mechanism which locks the seat back in the upright seat forming position is not responsive to the position of the seat cushion, but will only lock upon the operator moving a dedicated latching mechanism which will lock the seat back in the upright seat forming position.

The prior art does not disclose a locking mechanism for a seat back of a vehicular seating assembly wherein the locking and unlocking of the seat back is responsive to a non-locking procedure of manipulating the position of the seat cushion.

SUMMARY OF THE INVENTION AND ADVANTAGES

A vehicular seat assembly adapted for attachment to a floor of a vehicle is disclosed. The vehicular seat assembly comprises a seat cushion and a seat back supported for pivotal movement into and out of the seat forming position. The Vehicular seat assembly is characterized by locking means for selectively locking the seat back in the seat forming position and for selectively unlocking the seat back from the seat forming position in response to the pivotal movement of the seat cushion out of the seat forming position.

The advantage associated with the subject invention includes the ability for the seat back to become unlocked by moving the seat cushion out of the seat forming position eliminating the step of manually unlocking or unlatching the seat back prior to pivoting the seat back out of the seat forming position.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
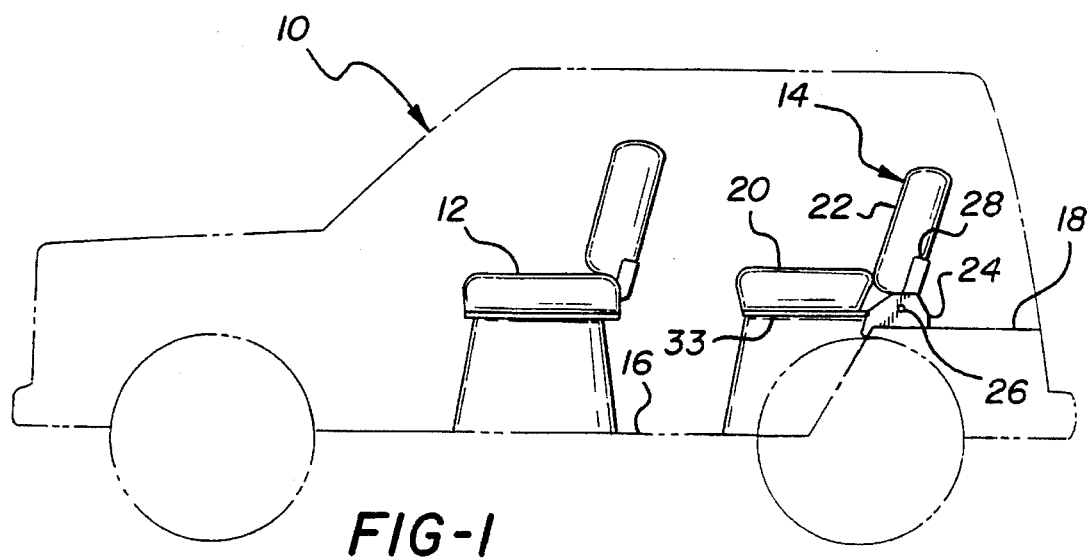
FIG. 1 is a side view of the preferred embodiment of subject invention shown in the cross-section of vehicle.
Figure 4:
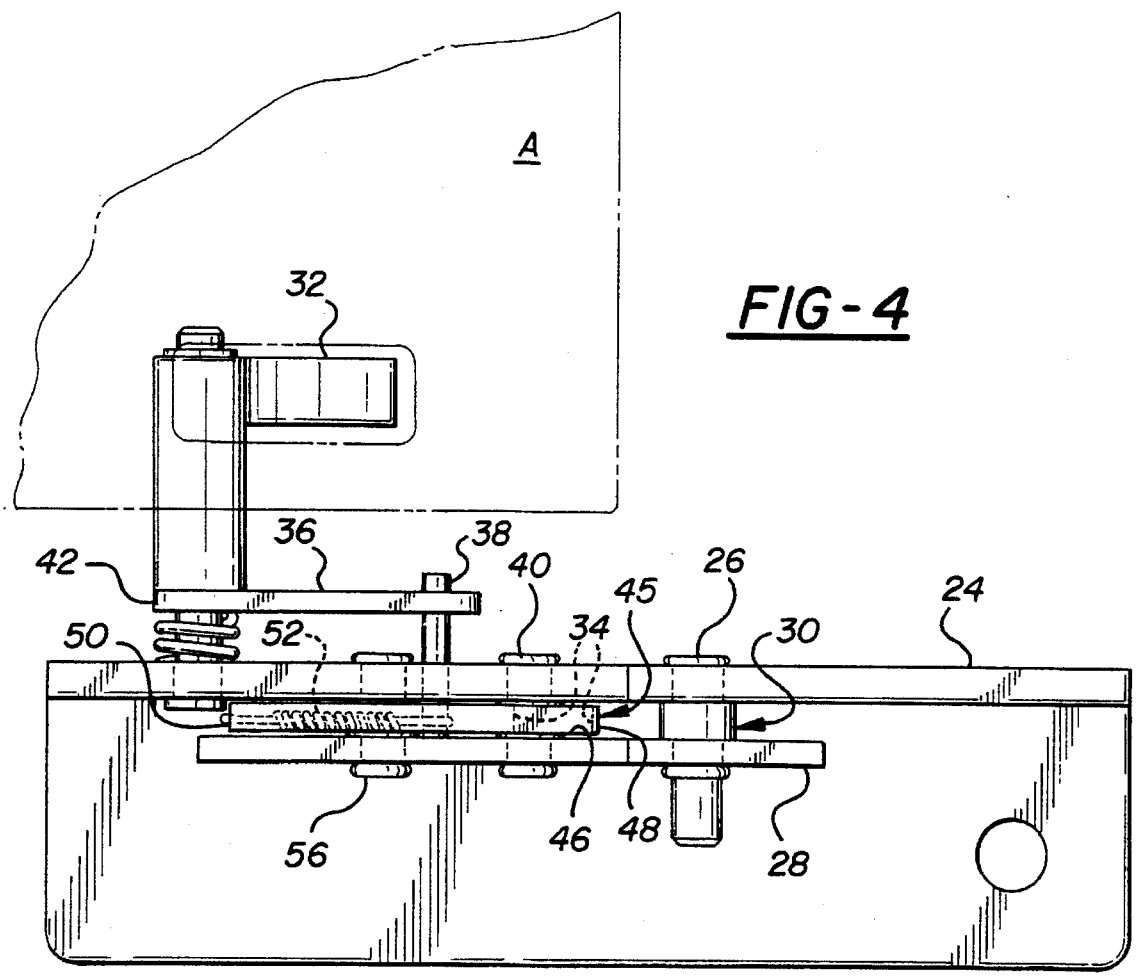
FIG. 4 is a side view of the preferred embodiment of the subject invention when the seat cushion and seat back are pivoted out of the seat forming position.
Figure 2:
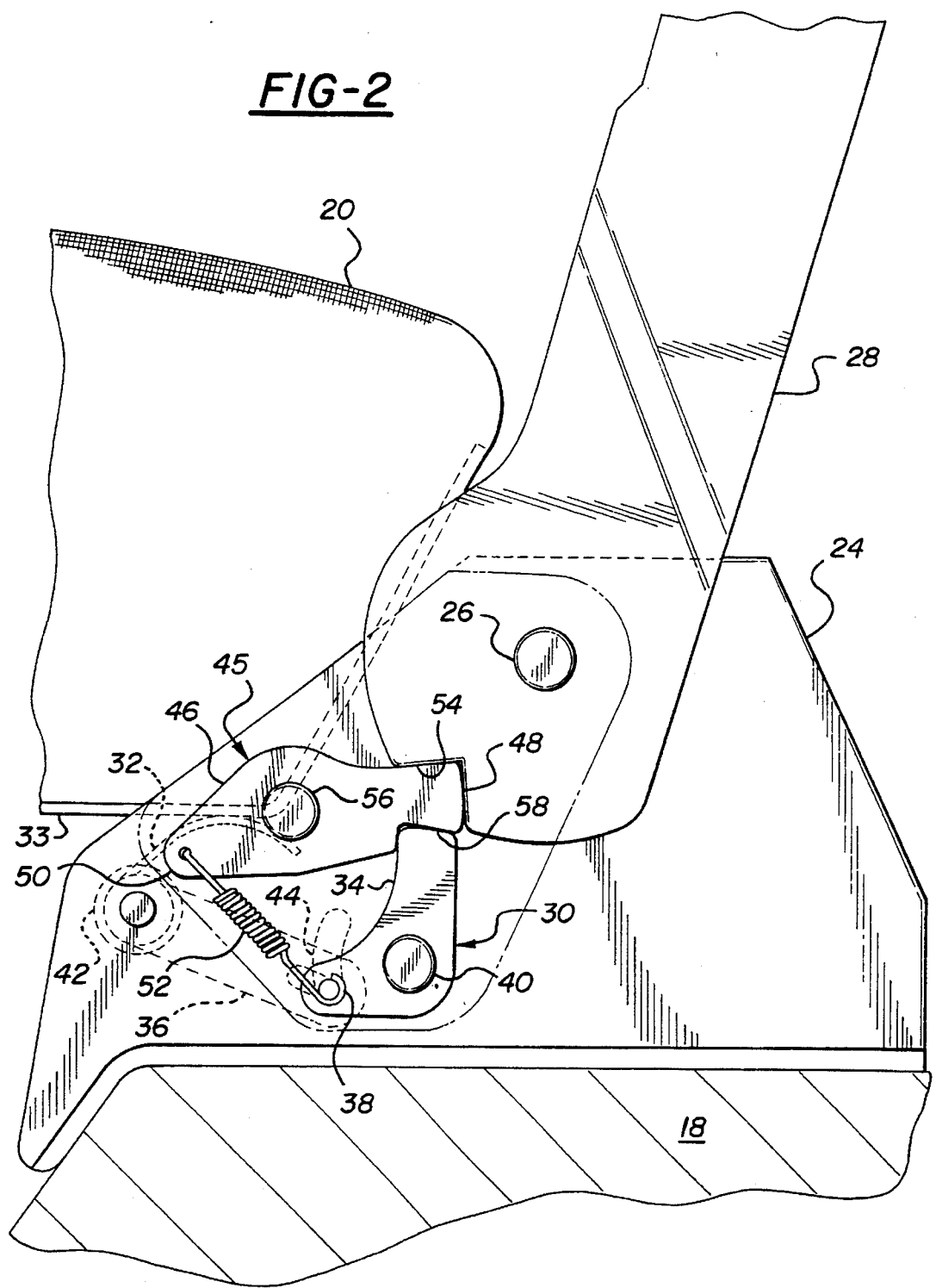
FIG. 2 is a side view of the preferred embodiment of the subject invention with the vehicular seat in the seat forming position.
Figure 3:
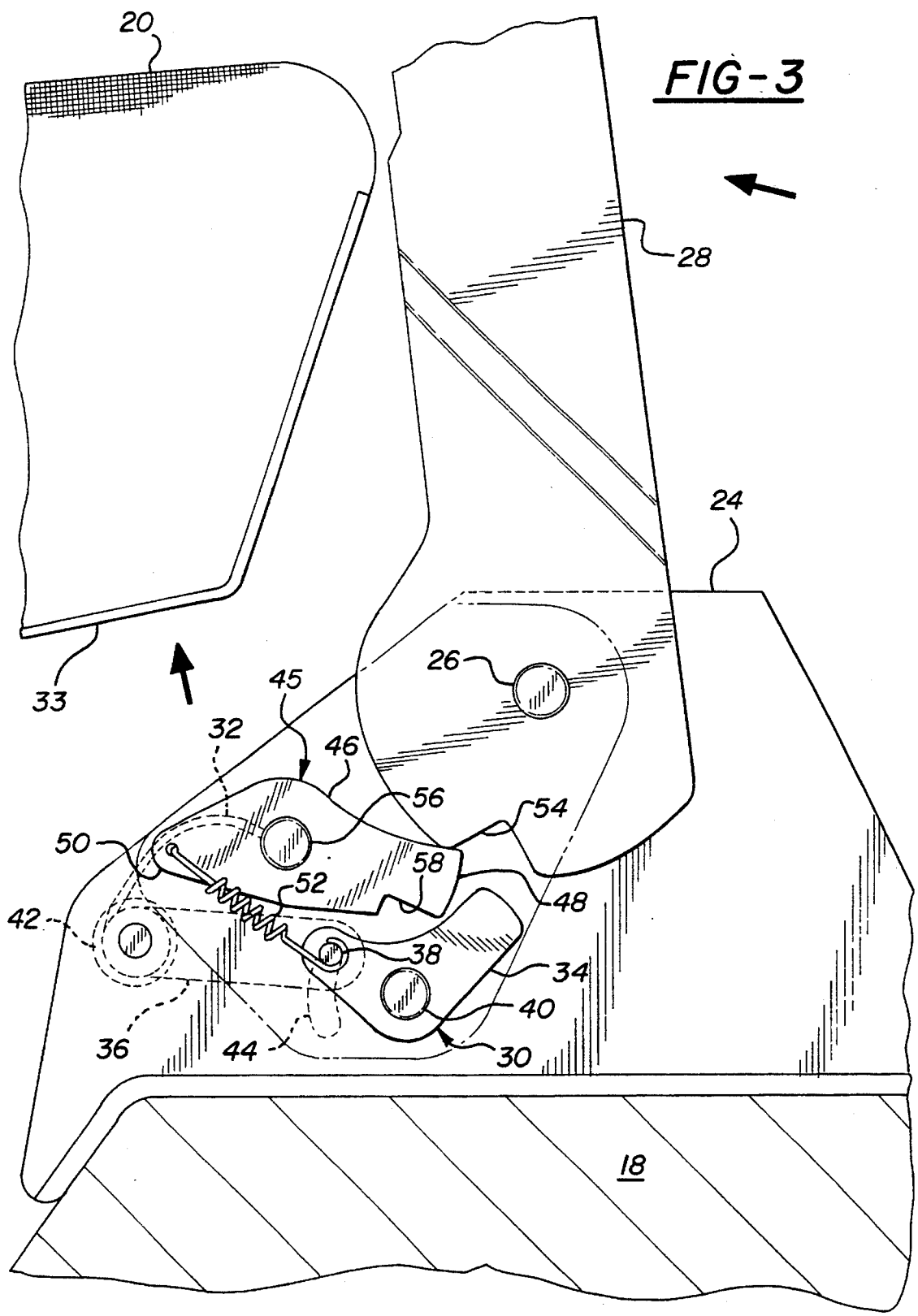
FIG. 3 is a top view of the preferred embodiment of the subject invention.

Turning to FIG. 1, a vehicle 10 is shown in cross section having a front seat 12 and a back or second seat 14. The front seat 12 is attached to the floor 16 of the vehicle 10 whereas the back seat 14 is attached to both the floor 16 and a load floor 18.

The back seat 14 includes a seat cushion 20 and a seat back 22. The seat cushion 20 and the seat back 22 are supported for pivotal movement into and out of a seat forming position, shown in FIG. 1. The seat back 22 is secured to the load floor 18 by a stanchion 24 by two seat back pins 26 (one of each shown) which are secured to hard portions 28 of the seat back 22. The seat cushion 20 pivots about seat cushion pins (none shown). Therefore both the seat back 22 and the seat cushion 20 rotate in the same direction about two separate and distinct points they being the seat back pins 26 and the seat cushion pins.

The stanchion 24, one on either side of the seat back 22 in the preferred embodiment, supports locking means, generally shown at 30, for selectively locking the seat back 22 in the seat forming position and for selectively unlocking the seat back 22 from the seat forming position in response to pivotal movement of the seat cushion 20 out of the seat forming position.

More specifically, the locking means 30 includes seat cushion receiving means 32 for receiving the seat cushion 20 thereon. The seat cushion receiving means 32 is a torsion bar having an arc in a plane perpendicular to a plane A defined by the bottom surface 33 of the seat cushion 20. The arc in the torsion bar 32 increases the resiliency of the torsion bar 32 from the repeated liftings and lowerings of the seat cushion 20. The locking means 30 further includes a bell crank 34 and a lever 36 pivotally secured to each other by a locking pin 38. The bell crank 34 is pivotal about pin 40 and is pivoted in response rotation of the lever 36. The other end 42 of the lever 36 is fiexedly secured to the torsion bar 32. Therefore, when the seat cushion 20 moves the torsion bar 32, the torsion bar 32 moves the lever 36 which, in turn, rotates the bell crank 34 about the bell crank pin 40. An arc 44 is cut out of the stanchion 24 and receives the locking pin 38 therein. The arc 44 provides the limits through which the bell crank 34 and the lever 36 may rotate.

Positioning means, generally indicated at 45, positions the seat back 22 in the seat forming position. The positioning means 45 includes a pawl 46 for positioning the seat back 22 in the seat forming position. The pawl 46 includes seat back 48 and locking 50 ends. The seat back end 48 is adapted to be received by the hard support portion 28 of the seat back 22 whereas the locking end 50 is interconnected with the locking means 30 by timing means 52 (discussed subsequently). The seat back end 48 of the pawl 46 is received by a notch 54 in the seat back 22. The pawl 46 rotates about the pawl pin 56 and is spring biased to engage the seat back notch 54.

The seat back end 48 of the pawl 46 includes a locking receiving surface 58 for receiving the locking means 30 to prevent the disengagement of the seat back end 48 of the pawl 46 from the seat back 22. The locking receiving surface 58 is the surface of the seat back end 48 directly opposite that surface which is received in the seat back notch 54. The locking receiving surface 58 receives the bell crank 34 and holds the seat back end 48 between the seat back 20 and the bell crank 34, i.e., the seat back end 48 is sandwiched therebetween.

Timing means 52 times the locking means 30 and the positioning means 46 such that the locking means 30 locks the seat back 22 in the seat forming position after the positioning means 46 positions the seat back 22 in the seat forming position. The timing means 52 includes a spring 52 interconnecting the locking means 30 and the locking end of 50 of the pawl 46. The spring 52 maintains the locking end 50 of the pawl 46 and the one end of the bell crank 34, as close together as possible. Therefore, when the bell crank 34 is rotated away from the pawl 46, the pawl 46 increases the amount of force required to move the seat back 22 out of the seat forming position. The spring 52 also forces the seat cushion receiving means 32 toward the seat cushion 20 allowing the bell crank 34 to rotate out of the locking position when the seat cushion 20 is rotated out of the seat forming position. The spring 52 forces the bell crank 34 to pivot away from the seat back 20 to insure the pawl 46 can positively position the seat back 20 without the bell crank 34 interfering.

In operation, when the seat cushion 20 is unlatched, a common latching mechanism well known in the art, the seat cushion 20 is pivoted up toward the front seat 12 of the vehicle 10. The seat cushion receiving means 32 rotates upwardly which, in turn, rotates the bell crank 34 via the lever 36 out of locking engagement with the pawl 46, thus unlocking the seat back 22. On returning the seat back 22 to the seat forming position, the seat back 22 rotates back until the seat back end 48 of the pawl 46 locks into the seat back notch 54 preventing the seat back 22 from rotating any further back. Once the seat cushion 20 is rotated down into the seat forming position, the seat cushion receiving means 32 rotates the lever 36 in a downward direction forcing the bell crank 34 back into the lock receiving surface 58 of the locking end 50 of the pawl 46.

The invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, reference numerals are merely for convenience and are not to be in any way limiting, the invention may be practiced otherwise than as specifically described.

I claim:

1. A vehicular seat assembly (14) adapted for attachment to a floor (16, 18) of a vehicle (10), said vehicular seat assembly (14) comprising:

a seat cushion (20) and a seat back (22) supported for independent pivotal movement into and out of a seat forming position, said seat forming position defined by said seat cushion (20) in a generally horizontal position adjacent to said floor (16, 18) and said seat back (22) in a generally upright vertical position;

positioning means (45) operatively coupled to said seat back (22) for positioning said seat back (22) in said seat forming position;

seat cushion receiving means (32) for receiving said seat cushion (20) in said seat forming position, said vehicular seat assembly (14) characterized by:

locking means (30) operatively connected between said positioning means (45) and said receiving means (32) for selectively engaging said positioning means (45) with said seat back (22) to lock said seat back (22) in said seat forming position in response to said seat cushion (20) pivoted to said horizontal position and received on said seat cushion receiving means (32) and for selectively unlocking said seat back (22) from said seat forming position in response to said independent pivotal movement of said seat cushion (20) away from said receiving means (32) and out of said seat forming position.

2. An assembly (14) as set forth in claim 1 further characterized by timing means (52) operatively connected between said locking means (30) and said positioning means (45) for timing said locking means (30) and said positioning means (45) such that said locking means (30) locks said seat back (20) in said seat forming position after said positioning means (45) engages and positions said seat back (22) in said seat forming position.

3. An assembly (14) as set forth in claim 2 further characterized by said positioning means (45) including a pawl (46) for positioning said seat back (22) and said seat forming position.

4. An assembly (14) as set forth in claim 3 further characterized by said pawl (46) including a seat back end (48) and a locking end (50), said seat back end (48) adapted to be engaged with said seat back (22) and said locking end (50) being interconnected with said locking means (30) by said timing means (52).

5. An assembly (14) as set forth in claim 4 further characterized by said seat back end (48) including a lock receiving surface (58) for receiving said locking means (30) to prevent disengagement of said seat back end (48) of said pawl (46) from said seat back (22).

6. An assembly (14) as set forth in claim 5 further characterized by said timing means (52) including a spring (52) interconnecting said locking means (30) and said locking end (50) of said pawl (46).

7. An assembly (14) as set forth in claim 6 further characterized by a stanchion (24) adapted for attachment to a floor (14) of a vehicle (10), said stanchion (24) pivotally securing said seat back (22) to prevent rectilinear fore and aft motion thereof.

8. An assembly (14) as set forth in claim 7 further characterized by said locking means (30) including a bell crank (34) contacting said lock receiving surface (58) to force said pawl (46) into engagement with said seat back (22) when seat back (22) and said seat cushion (20) are in said seat forming position.

9. An assembly (14) as set forth in claim 8 further characterized by including a lever (36) having a first end connected to said seat cushion receiving means (32) and a second end pivotally coupled by a locking pin (38) to said bell crank (34).

10. An assembly (14) as set forth in claim 9 further characterized by said stanchion (24) defining an arcuate slot (44) for receiving said pin (38) to limit the degree of pivoting of said bell crank (34) and said lever (36).

11. An assembly (14) as set forth in claim 10 further characterized by said seat cushion receiving means (32) being fixedly secured to said lever (36) to rotate said lever (36) upon said seat cushion receiving means (32) receiving said seat cushion (20), said lever (36) rotating said bell crank (34) to engage said locking receiving surface (58) to lock said seat back end (48) of said pawl (46) into said seat back (22) preventing the pivotal movement thereof.

12. A vehicular seat assembly (14) adapted for attachment to a floor (16, 18) of a vehicle (10), said vehicular seat assembly (14) comprising:

a seat cushion (20) and a seat back (22) supported for independent pivotal movement into and out of a seat forming position;

a stanchion (24) fixed to said floor (16, 18) and pivotally supporting said seat back (22);

a pawl (46) pivotally connected to said stanchion (24) for engaging with a lower portion (28) of said seat back (23);

a torsion bar (32) coupled to said stanchion (24) for receiving said seat cushion (20) in said seat forming position; and a bell crank (34) operatively connected between said pawl (46) and said torsion bar (32), said bell crank (34) forcing said pawl (46) into engagement with the lower portion (28) of said seat back (22) to lock said seat back (22) in said seat forming position while said seat cushion (20) is received on said torsion bar and said bell crank (34) releasing said pawl (46) from engaged position with said seat back (22) to unlock said seat back (22) in response to said independent pivotal movement of said seat cushion (20) away from torsion bar (32) and out of said seat forming position.

13. An assembly (14) as set forth in claim 12 further characterized by including a lever (36) having a first end connected to said torsion bar (32) and a second end pivotally coupled to said bell crank (34).

14. An assembly (14) as set forth in claim 13 further characterized by including a spring (52) interconnecting said pawl (46) and said bell crank (34).

15. An assembly (14) as set forth in claim 14 further characterized by said torsion bar (32) being fixedly secured to said lever (36) to rotate said lever (36) upon said torsion bar (32) receiving said seat cushion (20), said lever (36) further rotating said bell crank (34) to engage and lock said pawl (46) into said seat back (22) in said seat forming position.

16. An assembly (14) as set forth in claim 15 further characterized by said pawl (46) including a seat back end (48) and a locking end (50), said seat back end (48) adapted to be engaged with said seat back (22) and said locking end (50) being interconnected with said bell crank (34) by said spring (52).

17. An assembly (14) as set forth in claim 16 further characterized by said seat back end (48) including a lock receiving surface (58) for receiving said bell crank (34) to prevent disengagement of said seat back end (48) of said pawl (46) from said seat back (22).

18. An assembly (14) as set forth in claim 17 further characterized by said stanchion (24) including a locking pin (38) interconnecting said bell crank (34) and said lever (36), said pin (38) slidable received in an arcuate slot (44) formed in said stanchion (24) for limiting the degree of pivoting of said bell crank (34) and said lever (36).

* * * * *